D. LIPPY.
TONGUE SUPPORT.
APPLICATION FILED MAY 22, 1908.
No. 904,270.
Patented Nov. 17, 1908.
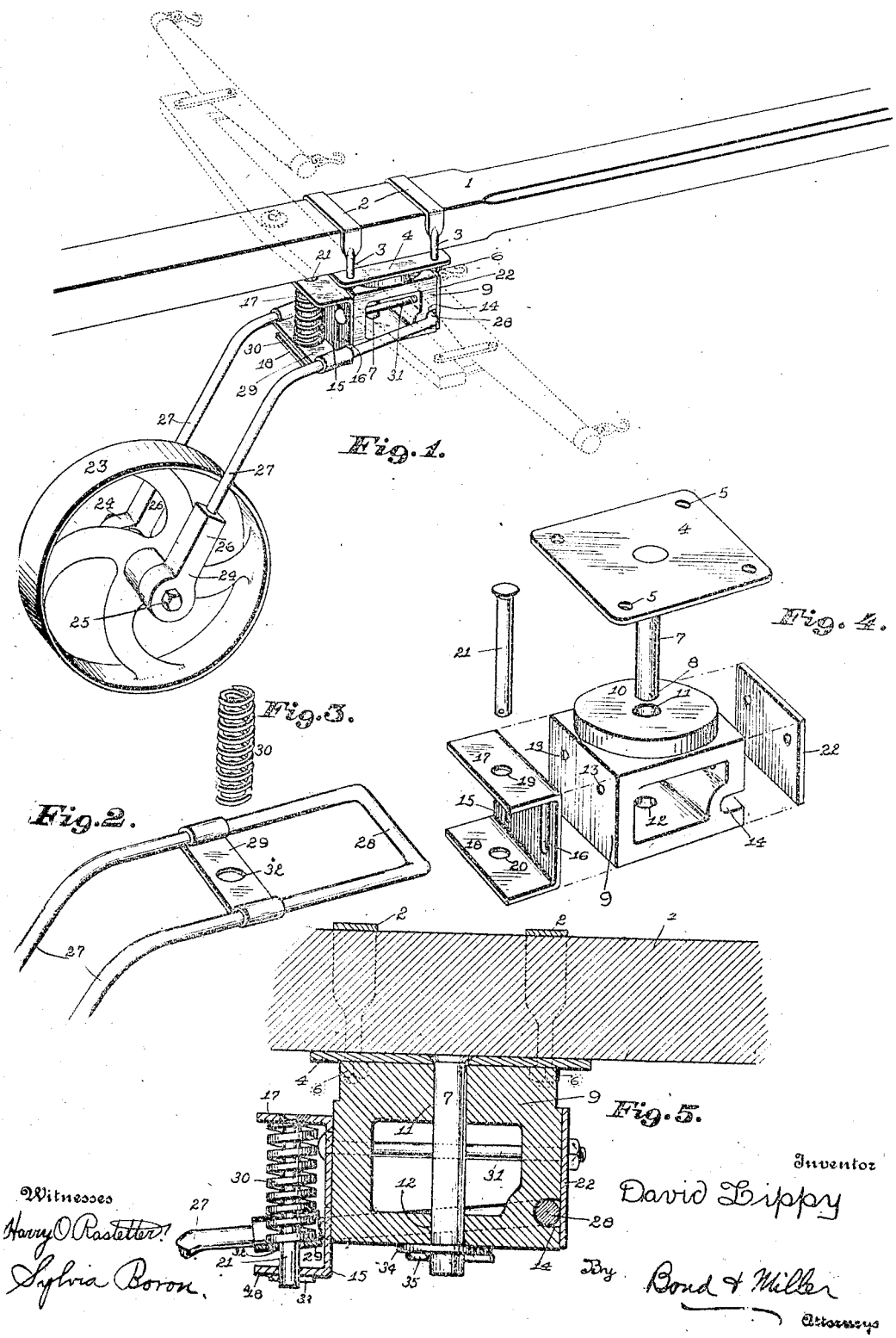

UNITED STATES PATENT OFFICE.

DAVID LIPPY, OF MANSFIELD, OHIO, ASSIGNOR TO WILLIAM W. PECHT, OF MANSFIELD, OHIO.

TONGUE-SUPPORT.

No. 904,270.  Specification of Letters Patent.  Patented Nov. 17, 1908.

Application filed May 22, 1908. Serial No. 434,284.

*To all whom it may concern:*

Be it known that I, DAVID LIPPY, a citizen of the United States, residing at Mansfield, in the county of Richland and State of Ohio, have invented a new and useful Tongue-Support, of which the following is a specification.

My invention particularly relates to supports for the heavy tongues on binders, disk harrows, mowers and other agricultural implements and in fact to supports for the tongues of any implements or vehicles which bear heavily upon the necks of the horses or are difficult for them to control; and the objects of my improvement are, first, to relieve the horses' necks from strain and chafing; second, to steady the implement or vehicle upon which my improvement is used and cause it to run lighter; third, to relieve the implement or vehicle from unnecessary and severe strains and jarring, thus reducing wear; fourth, to provide a tongue support which will be adjustable to the varying heights of tongues on the different implements or vehicles upon which it may be used. I attain these objects by the device illustrated in the accompanying drawing, in which—

Figure 1 is a perspective view of my tongue support properly attached to the tongue of an agricultural implement. Fig. 2 is a perspective view of a portion of the wheel arms, the lower ends of the same being broken away. Fig. 3 is a perspective view of the coil spring. Fig. 4 is a perspective view of the swivel plate, swivel block, spring pin, spring housing and retaining plate, all of the same being separated slightly from each other, but in appropriate positions to illustrate the method of assembling. Fig. 5 is a longitudinal section of the tongue, swivel plate, swivel block and various parts immediately connected thereto.

Throughout the several views, similar numerals refer to similar parts.

The numeral 1 indicates the tongue to which is attached the whiffletree shown in dotted lines. Around the top and two sides of the tongue and preferably in front of the whiffletree are the bands 2, 2, which are provided at their ends with rounded portions 3 having screw threads thereon. The swivel plate 4 is preferably of rectangular form and extends beyond the sides of the tongue. At appropriate places to receive the rounded portions 3 are holes 5 through which the said rounded portions pass and the plate 4 is secured to the under side of the tongue by means of nuts 6 upon the threads on the rounded portions. Attached to the center of the swivel plate and extending downward at right angles to the plane thereof is the pin 7 by means of which a swivel or pivotal attachment is accomplished. The pin 7 is provided at its lower end with the hole 8 for the purpose hereinafter explained.

The swivel block 9 is provided with the integral portion 10, the upper surface of which is plain and circular in form and extends from the main portion of the block 9 to provide a practical bearing for the swivel block against the swivel plate. Through the top and bottom of the swivel block are arranged the holes 11—12 for the reception of the pin 7 and horizontally through the block are arranged the holes 13 for the purpose hereinafter described. At the forward end of the block 9 is arranged a groove 14 provided with a rounded bearing surface at its inward limit. The spring housing 15 is composed of a vertical portion having the vertical slots 16 and the upper and lower flanges 17 and 18 provided with holes 19 and 20 for the reception of the spring pin 21. The retaining plate 22 is provided with holes to engage the bolts passing horizontally through the swivel block and is for the purpose hereinafter set forth.

The wheel 23 is intended for travel upon the ground and is provided with a substantial hub and bushing of any well known and practical kind. The sand washers 24 are provided with slight circular depressions upon their inner faces to form cups with edges projecting slightly over the ends of the hub to prevent the entrance of dirt and sand. The bolt 25 extends through the sand washers and hub and provides the proper attachment or connection for the various parts. The upper portion of each sand washer is extended into the short arm 26 which is drilled longitudinally for the reception of the end of the wheel arm 27. The wheel arms are made of steel or other suitable material for strength and resiliency and the lower ends may be fastened within the holes drilled in the short arms 26 in any convenient and well known manner. At the upper ends the wheel arms form the integral transverse connection 28, which is designed to enter the groove 14, in the swivel block. The spring yoke 29 is provided for the purpose of strengthening the wheel arms, holding them in spaced relation and providing a bearing for the lower end of the coil compression spring 30.

In the assembling of the tongue support the swivel plate is attached to the tongue as before described. The wheel and its immediately adjacent parts being properly connected to the wheel arms as before described; the connecting portion 28 of the wheel arms is located within the slot 14. The spring housing 15 and the retaining plate 22 are then properly located and bolts 31 are extended through the slots 16, the horizontal holes in the swivel block and the holes in the plate 22 and the bolts drawn up so as to clamp the housing, block and plate together as shown in Figs. 1 and 5. The spring 30 is then located between the spring yoke 29 and the upper flange 17 of the spring housing and the pin 21 arranged through the hole 19, the spring 30, the hole 32 in the spring yoke and the hole 20 in the lower flange 18 of the spring housing, and the pin fastened as by a cotter 33. The swivel block is then located with the pin 7 extending through the holes 11 and 12 therein, and a washer 34 and cotter 35 provided, said cotter extending through the hole 8.

It will be apparent that the tongue support will be swiveled about the pin 7, and that in turning corners the wheel 23 will travel in its appropriate circle by reason of the pivotal adjustment. The weight of the tongue will rest upon the wheel and the spring 30 will accommodate unevenness in the ground and the consequent jars, which would be transmitted to the tongue if the said spring were not employed. For the purpose of adjusting the device to the varying heights of tongues on the different implements upon which the tongue support may be used, the bolts 31 may be loosened and the spring housing moved up or down with reference to the swivel block, said adjustment being permitted by reason of the slots 16 and fixed adjustment being permitted by tightening the bolts 31. In Fig. 5 the extreme lower adjustment is shown and it will be readily apparent that a considerable variation in heights of various tongues may be accommodated by means of this simple arrangement.

Having fully described my invention what I claim as new and desire to secure by Letters Patent, is—

1. The herein described tongue support, comprising a swivel plate attached to a tongue, a swivel block pivotally attached to said swivel plate, wheel arms, said wheel arms pivotally connected to the forward end of the swivel block by means of an integral transverse connection between said arms, a retaining plate and a spring housing attached to said swivel block, the said housing adapted for vertical adjustment, a wheel rotatably mounted between the ends of said wheel arms, a spring yoke arranged between said arms and attached thereto, and a spring located between the spring housing and the spring yoke, substantially as and for the purpose specified.

2. In a tongue support, a tongue, a swivel plate attached to said tongue, a swivel block pivotally connected to said swivel plate, wheel arms, a wheel mounted between said wheel arms at their rear ends, said wheel arms pivotally attached at their forward ends to said swivel block, a spring connection between said swivel block and said wheel arms at a point intermediate the pivotal connection of said arms and said wheel, and means for adjusting the attachment of said spring to said swivel block and for holding said attachment in fixed adjustment, substantially as and for the purpose specified.

3. In a tongue support, a tongue, a pivotally connected swivel block, wheel arms, a wheel mounted between said wheel arms at their rear ends, said wheel arms pivotally attached at their forward ends to said swivel block, a spring connection between said swivel block and said wheel arms at a point intermediate the pivotal connection of said arms and said wheel, and means for adjusting the attachment of said spring to said swivel block and for holding said attachment in fixed adjustment, substantially as and for the purpose specified.

4. In a tongue support of the class described, a tongue, a swivel plate attached to the underside of said tongue, a swivel block pivotally connected to said plate, wheel arms having a transverse integral connection at their forward end, a wheel rotatably mounted between said arms at the other end thereof, said arms pivotally connected at their forward end to said swivel block, a spring housing having an upper flange said housing attached to said swivel block, a spring yoke extending between said wheel arms intermediate the pivotal connection of said arms and said wheel and a spring located between said upper flange and said spring yoke, substantially as and for the purpose specified.

5. In a tongue support of the class described, a tongue, a swivel plate attached to the underside of said tongue, a swivel block pivotally connected to said plate, wheel arms, a wheel rotatably mounted between said arms at the rear end thereof, said arms pivotally connected at their forward ends to said swivel block, a spring housing having an upper flange, said housing adjustably attached to said swivel block, a spring yoke extending between said wheel arms intermediate the pivotal connection of said arms and said wheel, a spring located between said upper flange and said spring yoke, and means for holding said spring housing in fixed adjustment upon said swivel block, substantially as and for the purpose specified.

6. In a tongue support of the class described, the combination of a tongue, a swivel plate attached to said tongue, a swivel block pivotally connected to said swivel plate the said swivel block having in its forward end a transverse groove, a spring housing adjustably attached to the opposite end of said swivel block, wheel arms having attached thereto sand washers, a wheel mounted between said sand washers, said wheel arms having an integral transverse connection at their forward end said transverse connection located in said groove, a spring yoke arranged between said wheel arms and attached thereto at the rear of said swivel block, a spring connection between said spring housing and spring yoke and means for holding said spring housing in fixed adjustment upon said swivel block, substantially as and for the purpose specified.

In testimony that I claim the above, I have hereunto subscribed my name in the presence of two witnesses.

DAVID LIPPY.

Witnesses:
G. W. BAHL,
G. W. STATLER.